(12) United States Patent
Rieman et al.

(10) Patent No.: US 7,797,269 B2
(45) Date of Patent: Sep. 14, 2010

(54) METHOD AND APPARATUS USING A CONTEXT SENSITIVE DICTIONARY

(75) Inventors: John Rieman, Helsinki (FI); Minna Hekanaho, Oulu (FI); Minna Koutonen, Oulu (FI); Tero Rantonen, Oulu (FI); John Hard, Malmo (SE)

(73) Assignee: Nokia Corporation, Espoo (FI)

( * ) Notice: Subject to any disclaimer, the term of this patent is extended or adjusted under 35 U.S.C. 154(b) by 337 days.

(21) Appl. No.: 11/693,112

(22) Filed: Mar. 29, 2007

(65) Prior Publication Data

US 2008/0243736 A1 Oct. 2, 2008

(51) Int. Cl.
G06F 15/00 (2006.01)
G06F 3/02 (2006.01)
G09G 5/00 (2006.01)
(52) U.S. Cl. ........................................ 706/62; 345/168
(58) Field of Classification Search .................. 706/18, 706/62; 345/168–71, 173
See application file for complete search history.

(56) References Cited

U.S. PATENT DOCUMENTS

| 7,207,011 | B2* | 4/2007 | Mulvey et al. ............... 715/812 |
| 2002/0126097 | A1* | 9/2002 | Savolainen .................. 345/168 |
| 2005/0017954 | A1* | 1/2005 | Kay et al. .................... 345/169 |
| 2005/0283725 | A1* | 12/2005 | Griffin et al. ................. 715/532 |
| 2006/0265208 | A1* | 11/2006 | Assadollahi ................... 704/9 |
| 2007/0233463 | A1* | 10/2007 | Sparre ......................... 704/10 |

* cited by examiner

*Primary Examiner*—Donald Sparks
*Assistant Examiner*—Vincent M Gonzales
(74) *Attorney, Agent, or Firm*—Perman & Green LLP

(57) ABSTRACT

A method for a mobile communication apparatus including enabling the mobile communication apparatus for character input, comparing inputted characters with words in a list, prioritizing and listing matches of the comparison in a priority list depending on current context. Further, displaying the priority list, enabling selection from the displayed priority list and enabling updating of the list depending on current context. A corresponding application, apparatus, system, user interface and computer program is also disclosed.

20 Claims, 11 Drawing Sheets

METHOD AND APPARATUS USING A CONTEXT SENSITIVE DICTIONARY

TECHNICAL FIELD

The disclosed embodiments relates to methods for using a context sensitive predictive text dictionary in a portable apparatus, a rendering application, a portable apparatus comprising a display and means for navigating, and a computer-readable medium having computer-executable components.

BACKGROUND OF THE INVENTION

Communicating via text message services such as short message service (SMS), e-mail, instant messaging, etc., is very popular and plays an increasingly important role in our life.

One popular way of communicating these text messages is by using some kind of handheld communication device such as a mobile phone, a PDA, a palmtop computer, etc. However, entering text messages into these handheld communication devices is often a cumbersome work. While some computing and communication devices, such as personal computers, palmtop computers, and some mobile phones have been equipped with a full QWERTY keyboard for alphanumeric text entry, many other computing and communication apparatuses, such as mobile phones, PDAs, and PDTs, are equipped with a limited or no keyboard. Entering text into computing and communication apparatuses with a limited or no keyboard can be done in several ways. If the apparatus have no keyboard or keys the text can be entered by either writing the text on a special surface, e.g. the screen of the apparatus, with a stylus, or by tapping on a virtual keyboard displayed on the apparatuses screen. Text entering using a keyboard with a limited number of keys is often done by pressing a key a varying number of times, generally within a limited period of time, to input a specific letter. This technique is known as multi-tap. However, entering text with multi-tap or with a stylus is quite cumbersome for the user, especially if large quantities of text are going to be entered. Therefore, a number of text entering systems have been developed to facilitate and to speed-up the text entering. These systems, often referred to as single-tap system with predictive text technologies, uses predictive letter patterns to allow the user to enter text by press the keys as few times as possible.

The predictive text system uses a predictive text dictionary to "intelligently guess" which character(s) or word(s) the user is about to enter. The predictive text dictionary essentially contains a list of character strings, words, acronyms, abbreviations, etc. that is used to predict which word that is being entered by the user. When entering text using multi-tap or single-tap there may be several words that match a given keystroke (character) sequence. The predictive text system may then select the best match(es), i.e. making a priority list of matching words, based on information about word frequency in the used language or word frequency in the users idiolect.

However, there is still a need for improved features related to text input.

SUMMARY OF THE INVENTION

In view of the above, it would be advantageous to solve or at least reduce the problems discussed above. In particular, it would be advantageous to provide a user friendly and efficient context based predictive text system.

According to a first aspect of the disclosed embodiments, there is provided a method for a portable apparatus, comprising:

A method for a portable apparatus, comprising enabling said portable apparatus for character input, comparing inputted characters with words in a list, prioritizing and listing matches of said comparison in a priority list depending on current context, displaying said priority list, enabling selection from said displayed priority list, enabling updating of said list depending on current context.

The method may comprise a list being a context sensitive predictive text dictionary.

The method may comprise acquiring a dictionary for use in said updating of said list.

The method may comprise a context sensitive predictive text dictionary comprised of at least one dictionary.

The method may comprise communicating, by wire or wirelessly, with an external server via a network for acquiring said dictionary.

The method may comprise storing said dictionary(ies) via said network and retrieving said dictionary from said external server.

According to a second aspect of the disclosed embodiments, there is provided a rendering application for a portable apparatus comprising a display and navigation means where the application causing enabling of said portable apparatus for character input, comparing inputted characters with words in a list, prioritizing and listing matches of said comparison in a priority list depending on current context, displaying said priority list, enabling selection from said displayed priority list, and enabling updating of said list depending on current context.

According to a third aspect of the disclosed embodiments, there is provided an apparatus comprising a display and a comparator arranged to receive a user input, wherein the user input comprise at least one character input, and to compare inputted characters with words in a list. There is also provided a processor arranged to priorities and list matches of an output of said comparator in a priority list depending on current context, wherein said display is arranged to, under control of said processor to display said priority list, and wherein said user input selection from said displayed priority list, wherein said processor is arranged to update said list depending on current context based on said selection.

According to a fourth aspect of the disclosed embodiments, there is provided a computer-readable medium having computer-executable components comprising instructions for enabling said portable apparatus for character input, comparing inputted characters with words in a list, prioritizing and listing matches of said comparison in a priority list depending on current context, displaying said priority list, enabling selection from said displayed priority list, and enabling updating of said list depending on current context.

According to a fifth aspect of the disclosed embodiments, there is provided a system comprising an apparatus according to the third aspect of the invention, and a dictionary server arranged to provide the associated dictionary for downloading.

The system may comprise a communications network, wherein the dictionary server and the apparatus is in communication via the communications network.

According to a sixth aspect of the disclosed embodiments, there is provided a user interface comprising a display, and an input receiver, wherein said user interface is arranged to enable said portable apparatus for text input where said inputted characters are compared with words in a list and matches of said comparison are listed in a priority list, and to display said priority list in said display.

The second, third, fourth, fifth and sixth aspects of the disclosed embodiments may be combined in any way with the features of the first aspect of the disclosed embodiments.

In the above description a renderer should be interpreted as a functional block applicable to any communication device, such as a mobile phone, capable of performing at least one of the following tasks; receiving, comparing, prioritizing, listing, enabling, and updating.

Generally, all terms used in the claims are to be interpreted according to their ordinary meaning in the technical field, unless explicitly defined otherwise herein. All references to "a/an/the [element, apparatus device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other features and advantages of the disclosed embodiments will appear from the following detailed disclosure, from the attached dependent claims as well as from the drawings.

BRIEF DESCRIPTION OF THE DRAWINGS

The above, as well as additional features and advantages of the disclosed embodiments, will be better understood through the following illustrative and non-limiting detailed description of preferred embodiments, with reference to the appended drawings, where the same reference numerals will be used for similar elements, wherein.

DETAILED DESCRIPTION OF PREFERRED EMBODIMENTS

To better understand the problem addressed above a brief introduction is given. The predictive text systems does not compensate for changes in the users physical and social context. A person moves daily in and out of different physical and social context and the vocabulary used in these context may vary quite a lot. This change in vocabulary will also affect the vocabulary used when communicating via text messages in a mobile communication apparatus. For instance, when the user is in a work context the vocabulary used is often more formal than when engaged in some activity with close friends. When entering into new social context, such as joining a club, it is important for a user to quickly become aquatinted with the clubs values, norms, and vocabulary. It can for instance become quite embarrassing not using the right lingo in text messages to other members in the club. The same change in vocabulary happens when traveling, going on sport events, or when moving to a new and unfamiliar place where the customs and the culture is different.

Being able to use the right vocabulary in scenarios as described above when communicating via text messages, may become crucial for the users successful integration into a group, a workplace, a club, a culture, a country, etc. Since a predictive text system doesn't compensate for the vocabulary changes mentioned above it becomes unusable and is therefore turned-off by the many users.

Therefore it is important that the predictive text dictionary reflects the changes in context and support the user in these circumstances by giving the user relevant and correct prioritized suggestions when communicating via text messages.

Figure 1:
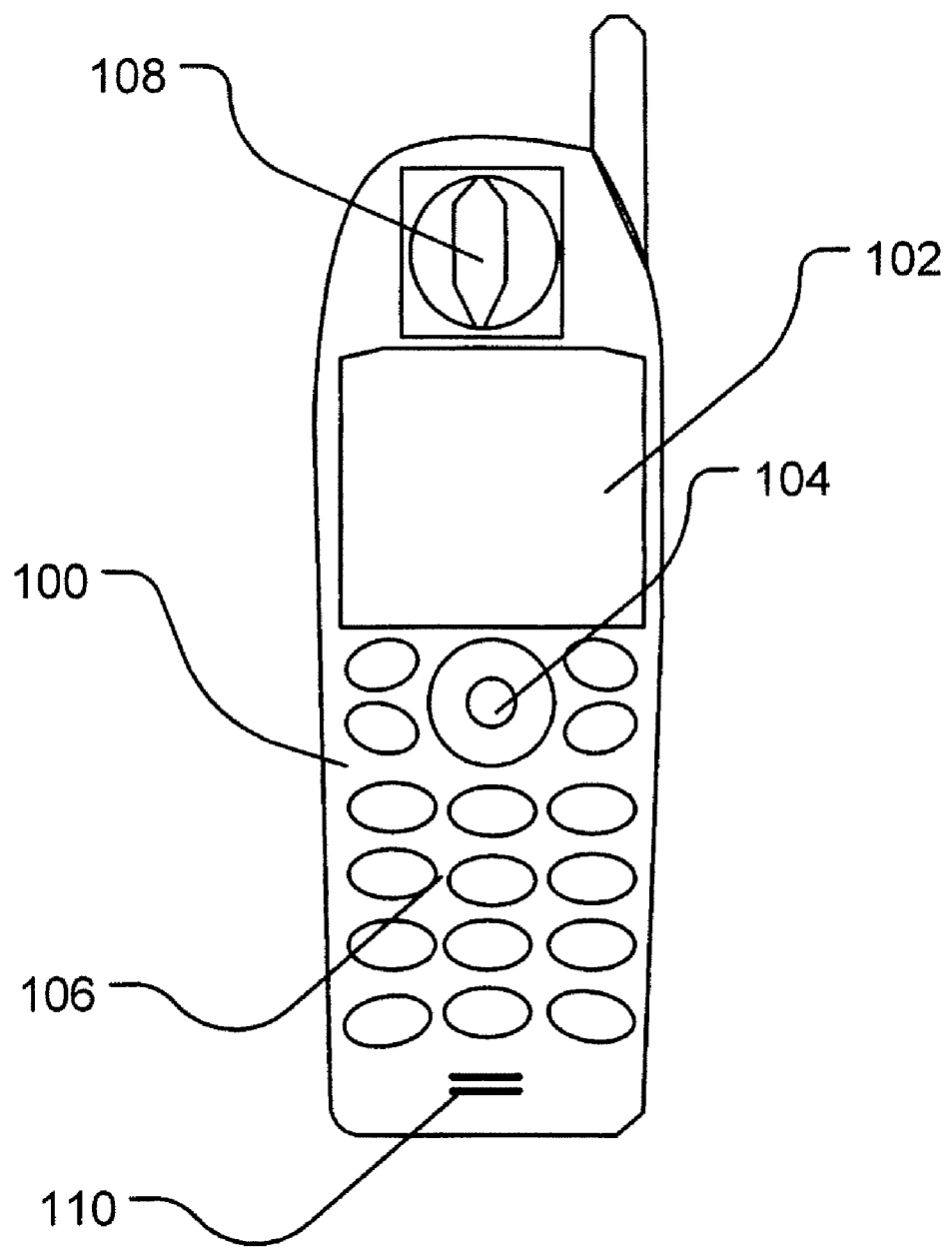
FIG. 1 shows a mobile communication apparatus according to an embodiment.

FIG. 1 shows a mobile communication apparatus 100 comprising a display 102 and means 104 for navigating among items (not shown) displayed in a display area 102. The navigation means 104 can be a rotating input, a joystick, a touch pad, but can also be implemented using a touch sensitive display, wherein the displayed items directly can be tapped by a user for selection, or be voice activated via a headset or a built-in microphone.

The mobile communication apparatus can also comprise other elements normally present in such an apparatus, such as a keypad 106, a speaker 108, a microphone 110, a processor (not shown), a memory (not shown), etc.

Figure 2:
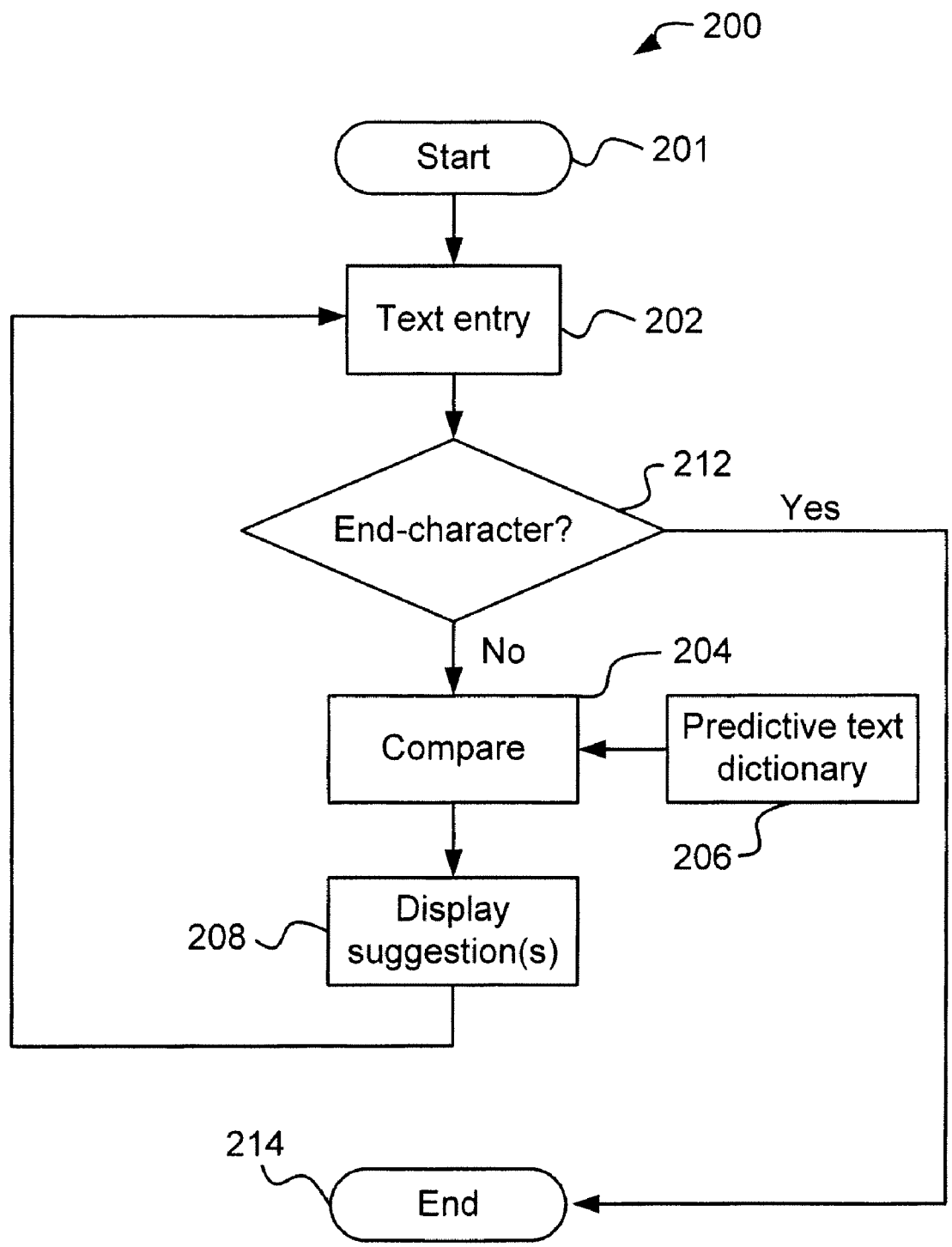
FIG. 2 shows a flow chart describing a common character input process using a predictive text dictionary.

FIG. 2 shows a flow chart illustrating a common process of entering text in a handheld communication device, such as a mobile phone, with a predictive text system 200. The alphanumerical characters can be entered 202 using a stylus, writing or tapping the characters on the screen or on a dedicated area of the apparatus, or by using all or some of the keys on the handheld communication apparatuses full or limited keyboard.

The last entered alphanumerical character is compared 212 with a predetermined and/or user configurable end-character such as a for example a 'space' character. If the entered 202 alphanumeric character is an end-character 212 the input of that specific character, group of characters, word, phrase, slang, abbreviation, etc. (hereinafter referred to as a word) is complete, and the text entry ends 214. If the user continues to enter alphanumerical characters after the end-character, i.e. begins to input a new word, the process restarts 201, else the user have entered all the words to complete a message and terminates the input process.

If no end-character is detected 212 the character entry is continued and the alphanumeric character, either by itself or in combination with other previous added characters forming a word or a part of a word, are compared in 204 with characters, words, phrases, abbreviations, slang, etc. stored in a predictive text dictionary 206. If one or several, complete or partial, matches between an entered word(s) 202 and words in the dictionary 206 are detected, they are made available, e.g. displayed on the screen of the handheld communication apparatus as a list of suggestions, to the user 208. If several matches are found they are displayed in the suggestions list.

The user is then able to choose any of the available words from the displayed suggestions list using the navigation means 104 mentioned in conjunction with FIG. 1. The character input process is continued 202 regardless of if the user chooses a word from the displayed list or continues to input characters. The input process continuous until an 'end character' is detected 212 or the character input is terminated by the user.

Figure 3:
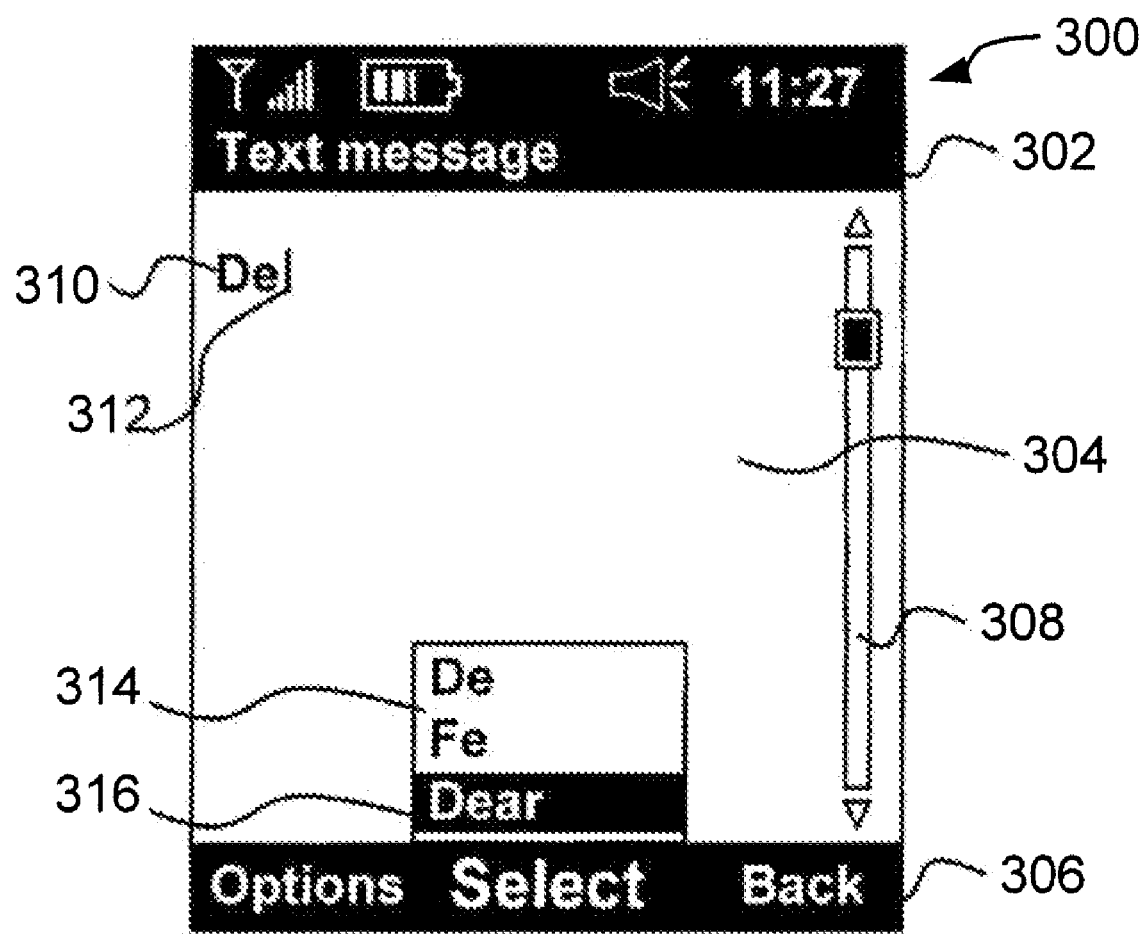
FIG. 3 shows a display view of a handheld communication apparatus.

FIG. 3 illustrates an example of a common display view in a handheld communication apparatus 300, running a predictive text system, comprising a general status indication section 302, a softkey bar 306 and a general display area 304. The general status indication section 302 can for example include symbols for battery status, reception quality, speaker on/off, present mode, clock time, etc. The status indication section is not in any way limited to only include these symbols. Thus, other symbols in any shape, form, or color can occur. The softkey bar 306, situated at the bottom of the display view, is operable using the navigation means 104 mentioned in conjunction with FIG. 1. The functions of these softkeys are not limited by the functions indicated in the figure.

The preferred function of the general display area 304, residing between the status indication section 302 at the top and the softkey bar 306 at the bottom, is to display information from running applications in the handheld communication apparatus. In our case the display area 304 also comprise a scroll bar 308, a suggestion list 314, inputted characters 310, and a cursor 312 showing where next character, word, phrase, abbreviation, etc. can be inputted.

FIG. 3 shows an example of how a common predictive text system, such as described in FIG. 2, operates. A user has entered the characters 'D' and 'e' 310 which together with a cursor 312 is shown at the top of the display views display area 304. The last entered character is 'e' which in this case is not an end-character. The two characters 'D' and 'e' forms the word 'De' which is compared against the words and the letter combinations stored in the predictive text dictionary. Several matches are found and they are displayed to the user in a suggestion list 314. The displayed suggestions are 'De', 'Fe', and 'Dear' where 'De' is rated the most likely word (highest priority) and therefore displayed first in the list. 'Fe' is rated second most likely (priority 2) and 'Dear' rated third most likely (priority 3). Since the user in this example wants to enter the word 'Dear', the user have to navigated amongst the suggestions down to the suggestion 'Dear', indicated by the black cursor bar 316. The user selects 'Dear' by operating 'Select' in the softmenu and 'De' is replaced by 'Dear' 318 as shown in the figure. The user can continue to enter characters, for example a 's' to complete the word 'Dears' or enter a 'space', indicating that the word is complete and a new word is going to be entered, thus restarting the inputting and prediction process as described in conjunction with FIG. 2.

A common predictive text system as the one depicted in FIG. 2 and exemplified in FIG. 3, suffers from the problems discussed in the above section describing the background of the invention. The predictive text system in FIG. 2 will not compensate for changes in the users context.

Figure 4:
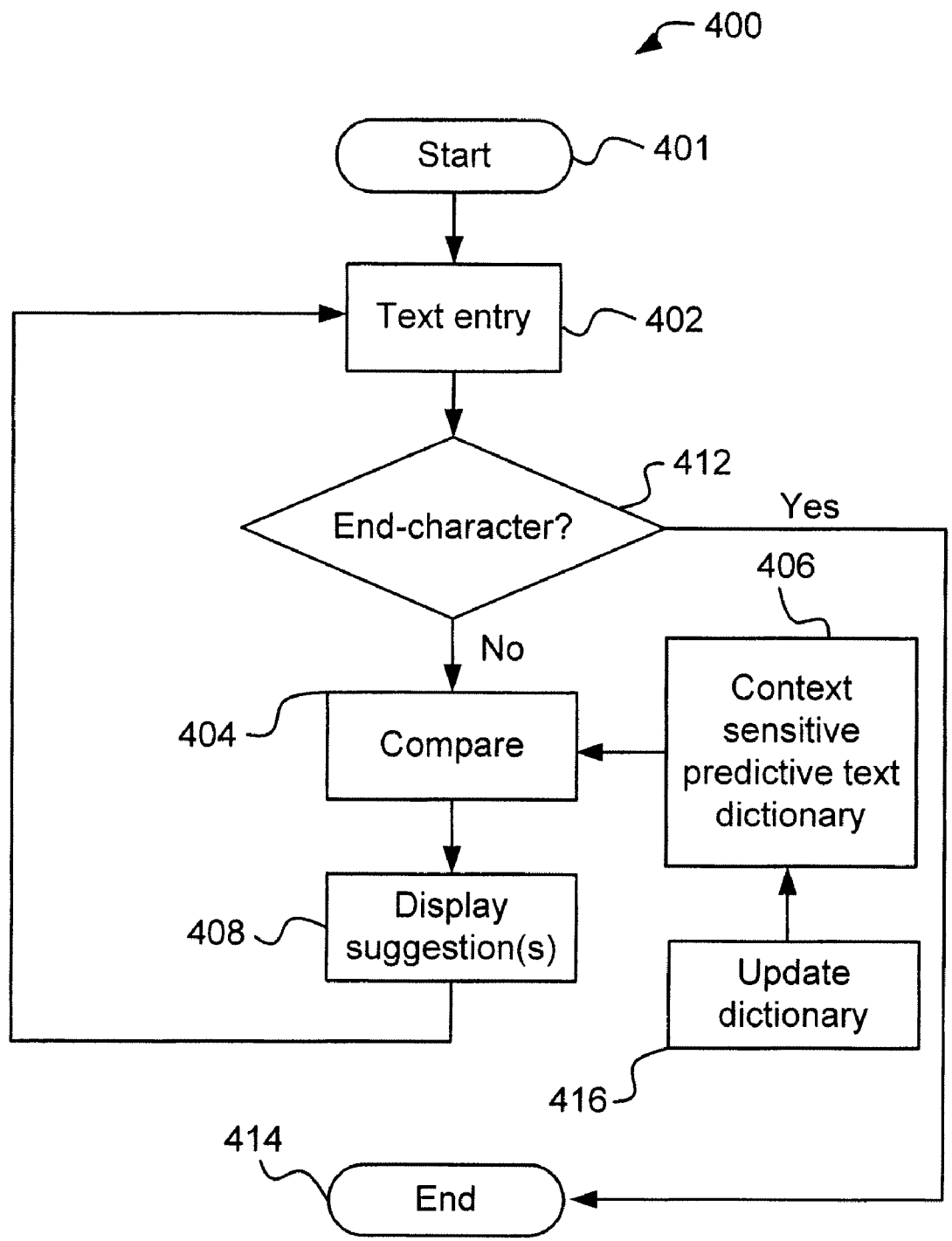
FIG. 4 shows a flow chart describing a character input process using an context sensitive predictive text dictionary.

FIG. 4 shows a flow chart illustrating an embodiment comprising a process of entering text in a handheld communication device, such as a mobile phone, with a context sensitive predictive text system 400. The alphanumerical characters can be entered 402 using a stylus, writing or tapping the characters on the screen or a dedicated area of the apparatus, or by using all or some of the keys on the handheld communication apparatuss full or limited keyboard.

The last entered alphanumerical character is compared 404 with a predetermined or user configurable end-character such as for example a 'space' character. If the entered 402 alphanumeric character is an end-character 412 the input of that specific character, characters, word, phrase, slang, abbreviation, etc. is completed and the text entry is ended 414. If the user continues to enter alphanumerical characters after the end-character, i.e. begins to input a new word, the process restarts 401, else the user have entered all the words to complete a message and terminates the input process.

If no end-character is detected 412 the character entry is continued and the alphanumeric character, either by itself or in combination with other previous added characters forming a word or a part of a word, are compared in 404 with characters, words, phrases, abbreviations, slang, etc. stored in the context sensitive predictive text dictionary 406.

If one or several, complete or partial, matches between an entered character or word(s) 402 and words in the context sensitive predictive text dictionary 406 are detected, they are made available, e.g. displayed on the screen of the handheld communication apparatus as a list of suggestions 408, to the user. Multiple matches are displayed in the suggestions list in a prioritized order with the most likely at the top of the list. Words that are never or seldom used by a user, words that in a specific context is unlikely to be chosen, and words that in a context is deemed inappropriate words can be made to (user configurable) not appear in the suggestion list 408, thus making the list considerably shorter. Suggestions displayed in the suggestion list 408 can also be highlighted in different way to signal to the user that the specific suggestion differs in some way from other suggestions. Words can also be prioritized differently depending in what context the user currently is in. These measures will speed-up the selection process considerably since the user does not have to navigate a long suggestions list 408 to find the correct word. Optimally the wanted word is always displayed at the top of the suggestion list. The user is then able to choose any of the available words from the displayed suggestions list using the navigation means 104 mentioned in conjunction with FIG. 1. The text input process is continued 402 regardless of if the user chooses a word from the displayed suggestion list 408 or just continues to input new characters 402. The input process continuous until an 'end character' is detected 412 or the text entry is terminated by the user.

The context sensitive predictive text dictionary 406 is adaptive meaning that the content of the dictionary is subject for continuous updating and adaptation 416 depending on the current context. New context-based dictionaries can be downloaded by the user or done automatically and can either be added to, replacing, or merged (resulting in the union of both) 416 with the context sensitive predictive text dictionary currently active. For instance, when a user enters a nightclub the handheld communication device automatically downloads a small context based dictionary, which is added to the active context sensitive predictive text dictionary. When the user tries to text a friend, or the person attending the bar to order a drink, new words will appear in the suggestion list belonging to the nightclub context.

Figure 5:
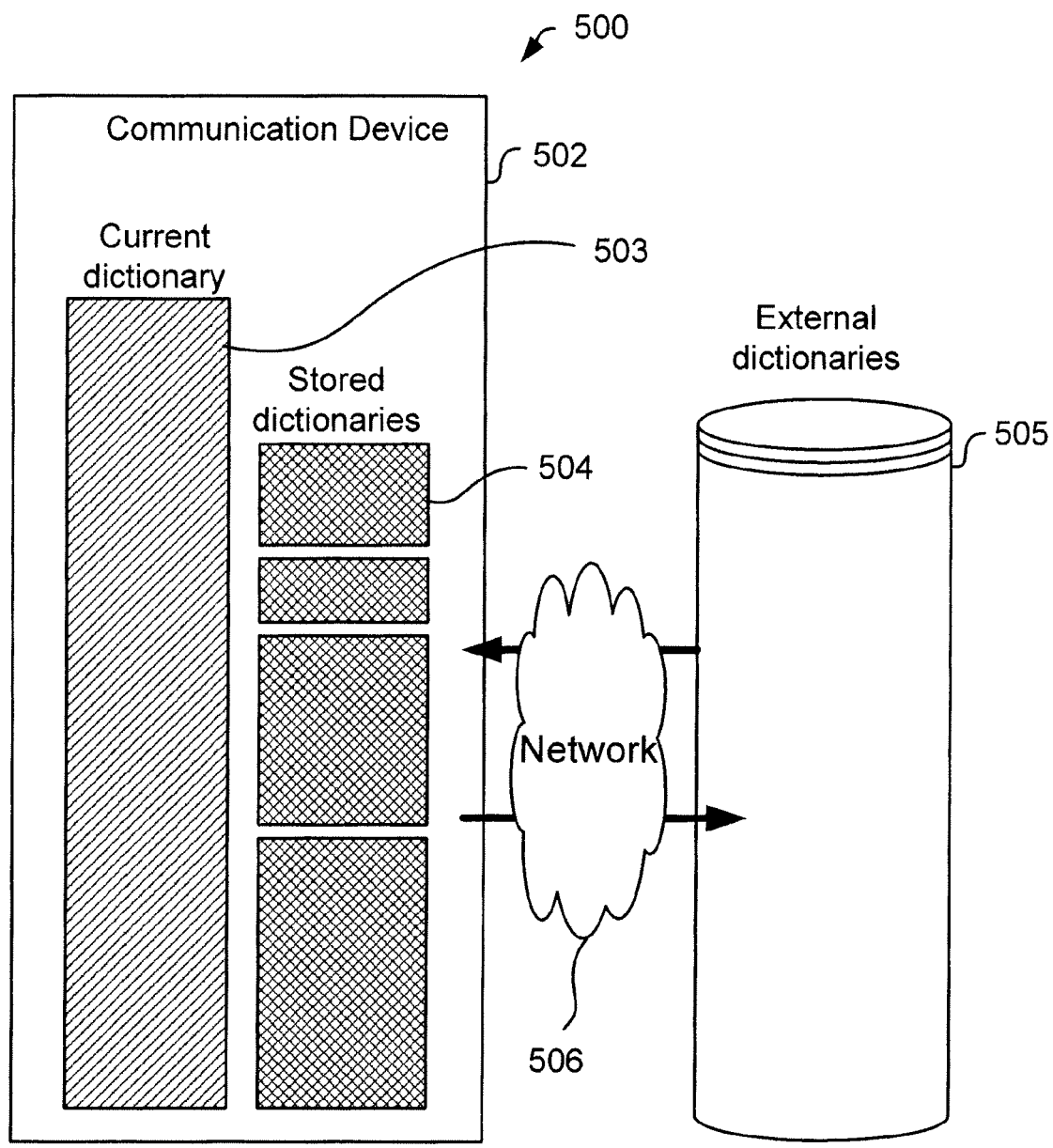
FIG. 5 shows a display view of a handheld communication apparatus exemplifying an embodiment.

The handheld device 500 in FIG. 5 may have, depending on available storage, one or more dictionaries stored 504 and operating in the devices memory 502 at one time. If the storage size in the device is large, a standard dictionary 503 (hereinafter called a full dictionary) together with several smaller customized context based dictionaries 504 can be stored in the device at the same time. If the storage size is small, a reduced full dictionary or only one or more customized dictionaries 504 may be stored at the same time in the device. If the storage size is small it is important that the dictionary in the device is tailored to the user so no unnecessary words (i.e. words never or seldom used by the user) in the dictionary take up valuable storage space.

The full dictionary 503 stores a multitude of character combinations and words from every possible subject while a custom context based dictionary focus on just one or a few particular areas. A custom context based dictionary 504 can for instance be a dictionary with words connected with a membership of a club or a dictionary comprising sponsored words used in marketing product. Context based dictionaries can also be customized to comprise words not appropriate (e.g. swear words), special interests (e.g. bird watching, computing, sports, beer, etc.), time and date, age group, recipient (e.g. friend, grandmother, co-worker, etc.). A dictionary can be set to expire at a certain point in time, when the user changes context, when the mobile communication apparatus becomes active (turned off), turns into sleep mode, turns into screensaver mode, when an application is terminated, an SMS, email or other text application is ended, etc. It can also be set to expire after a certain amount of time, on a specific date, or after running a certain application a specific number of times, or when the memory is full and another dictionary downloaded to the device. This avoids that the dictionary becomes irrelevant or stale.

As discussed above the internally stored dictionaries 502, can if wanted, be in constant change depending on the users change in context etc. To be able to safely store and to migrate the dictionaries to other handheld communication devices the dictionaries can be sent 506 to an external storage for safekeeping. This will also save precious internal storage 502 in the handheld communication device since not all custom dictionaries are needed to be stored internally.

Figure 6:
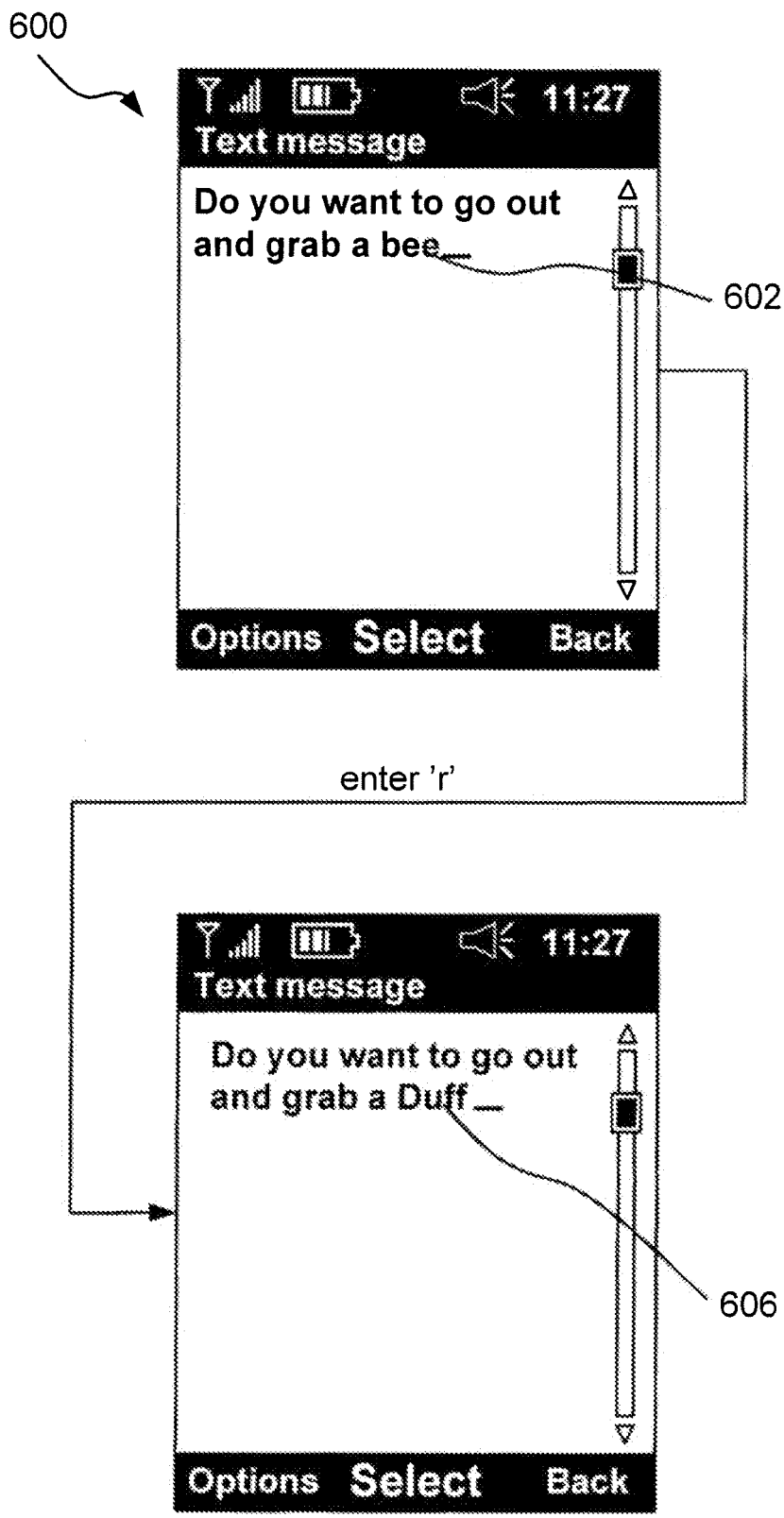
FIG. 6 shows a display view of a handheld communication apparatus exemplifying an embodiment.

FIG. 6 shows a display view 600 exemplifying an embodiment of the invention. A user have entered a text message saying 'Do you want to go out and grab a bee' 602. the User wants to enter the word 'beer', thus entering the character 'r' to complete the word. Since the user is a new and proud member of the local beer club he or she has not yet learned that the club have a 'code' stating ' . . . to honor our locally produced beer, members should never ever refer to our locally produced beer as just beer, a member should always refer to it with its name Duff or Duff beer . . . '. Fortunately, the user downloaded a customized context based predictive text dictionary to his or hers mobile communication apparatus when joining the beer club, so when the user enters the character 'r' completing the word 'beer' the context sensitive predictive text dictionary immediately replaces the word 'beer' with the locally produced beer name 'Duff' 606. Thus, saving the new members much embarrassment.

Figure 7:
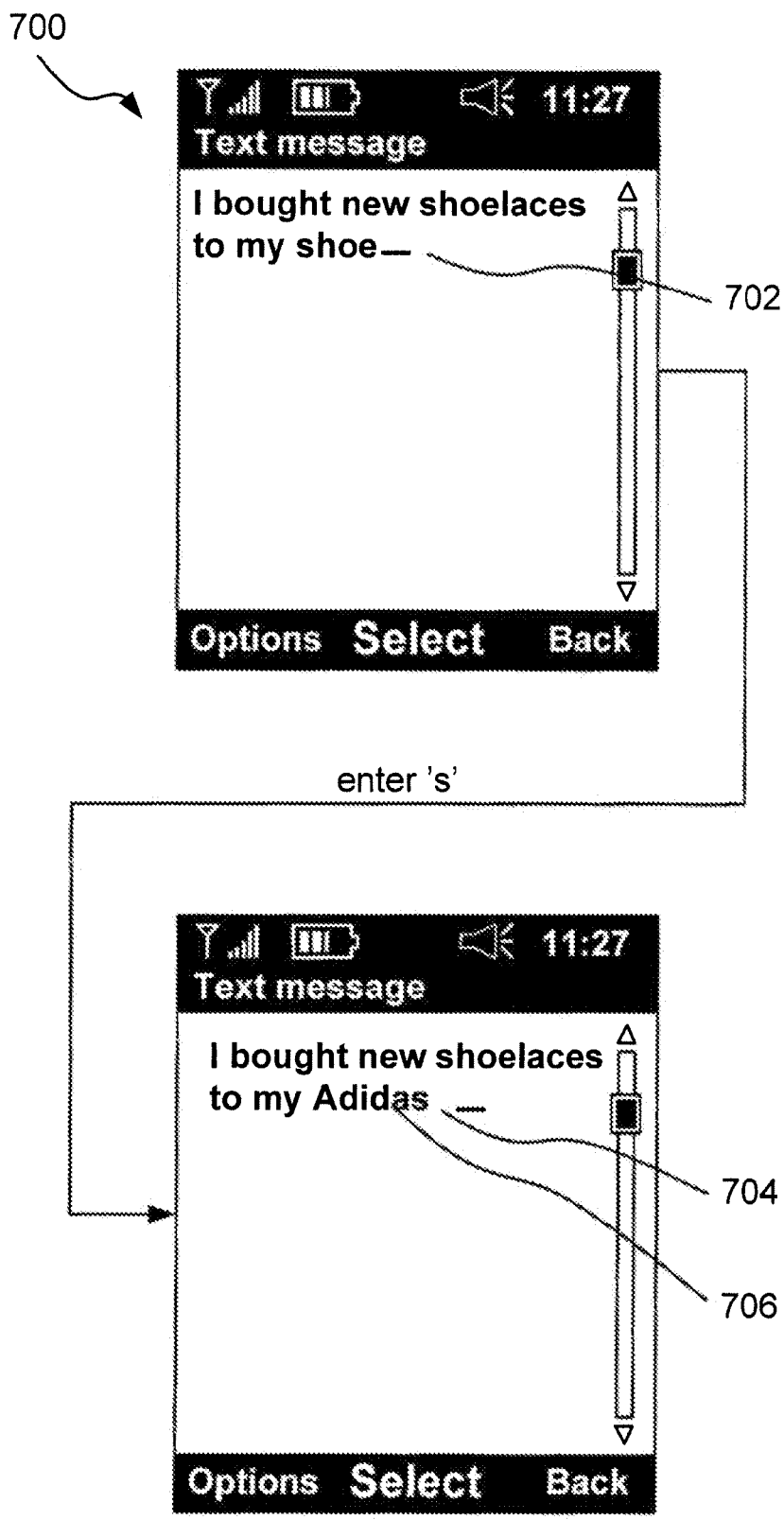
FIG. 7 shows a display view of a handheld communication apparatus exemplifying an embodiment.
Figure 8:
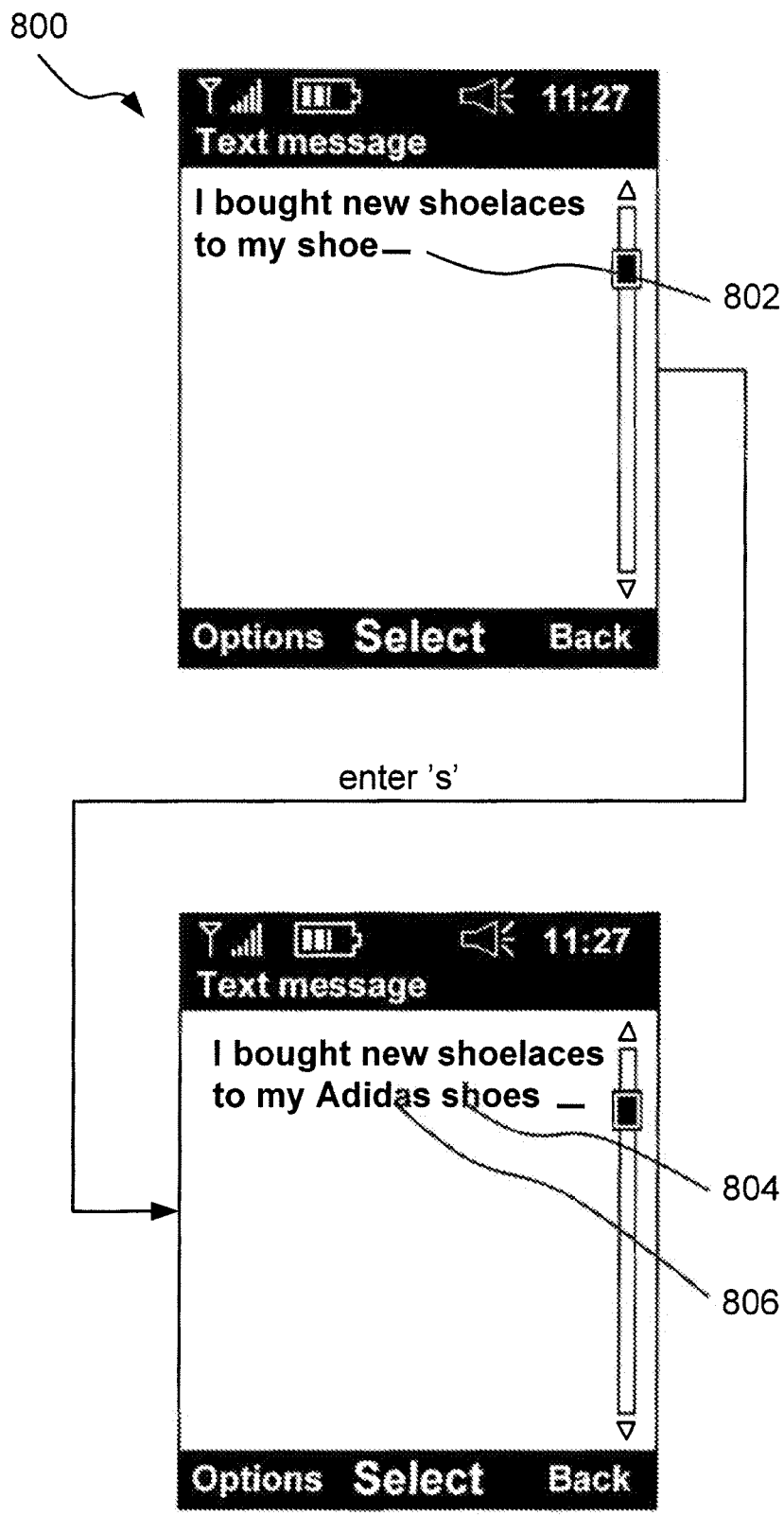
FIG. 8 shows a display view of a handheld communication apparatus exemplifying an embodiment.

FIG. 7 shows another aspect of the disclosed embodiments. Context sensitive predictive text dictionaries can also be used commercially. If for instance a user have a sponsored mobile communication apparatus or a sponsored communication subscription, context based dictionaries can (in some cases automatically) be downloaded which replaces certain words with the name of a commercial product i.e. a sort of product placement or advertising. For example a user, with a sponsored subscription, is shopping shoelaces, for his or hers sneakers, in a sports store and have entered, as shown in the display view 700 in FIG. 7, 'I bought new shoelaces to my shoe' 702, and are going to enter the character 's' thus completing the word 'shoes'. When the character 's' is entered the automatically downloaded context sensitive predictive text dictionary automatically replaces the word 'shoes' with the sponsored word 'Adidas' 706. If the user would have been shopping in another shoe store a different sponsored brand name, such as 'Gucci' might have replaced the word 'shoes'. FIG. 8 shows a variation of the embodiment presented in FIG. 7. In this case the sponsored word 'Adidas' 806 is inserted before the word 'shoes' 804, which as in FIG. 7 triggered the insertion of the sponsored word.

Figure 9:
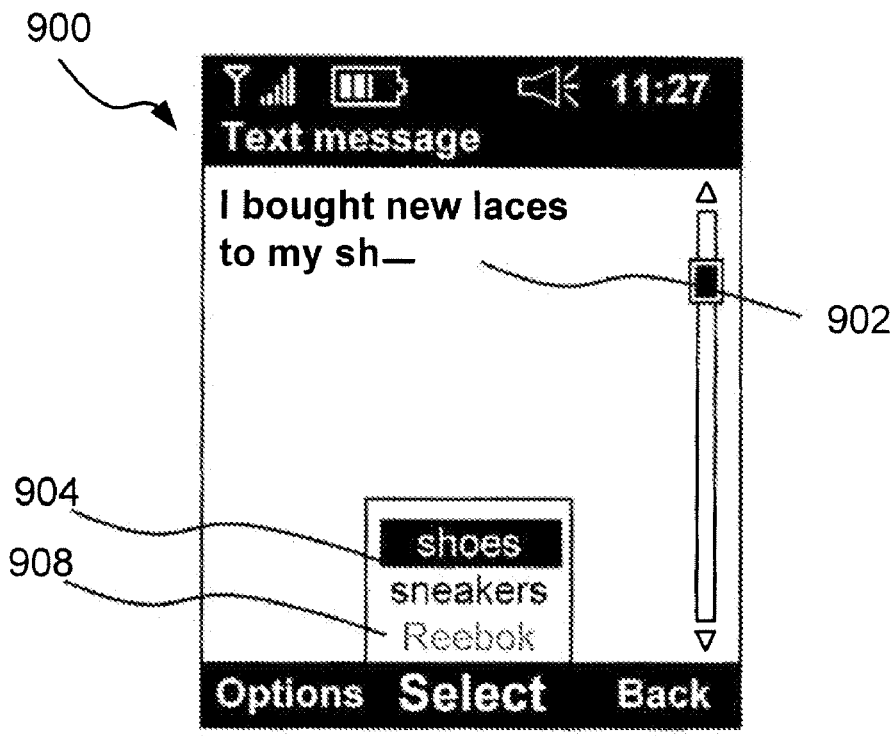
FIG. 9 shows a display view of a handheld communication apparatus exemplifying an embodiment.

FIG. 9 shows a display view 900 exemplifying an embodiment of the invention. In this example the user have entered 'I bought new laces to my sh' 902 in a text messages and the context sensitive predictive text dictionary suggests to the user, in a suggestion list 904, the words 'shoes', 'sneakers', and 'Reebok'. An ordinary predictive text system would have suggested i.e. the words 'shoes' and 'shirt' since a common predictive text dictionary do not consider the context. In this case a context-based dictionary was downloaded the same instance the user walked into the shoe store, in this case a sports shoe store. The two first suggested words in the suggestion list 904 are the two most likely words the user wants to enter depending on the context. The third word 'Reebok' 908 in the suggestion list 904 is in this example a sponsored word. The sponsored word 'Reebok' 908 in the suggestions list 904 are highlighted to indicate that it is a sponsored word. A sponsor may in an embodiment also be able to purchase a position higher on the suggestion list (e.g. a higher priority).

Figure 10:
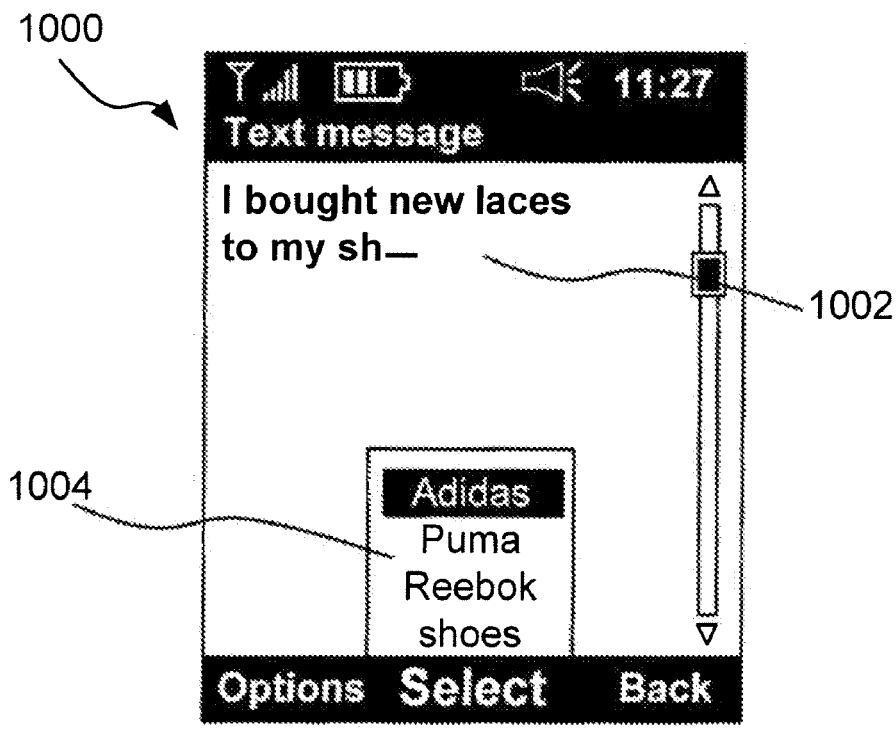
FIG. 10 shows a display view of a handheld communication apparatus exemplifying an embodiment.

FIG. 10 shows a display view 1000 exemplifying another embodiment of the invention. In this example the user have entered 'I bought new laces to my sh' 1002 in a text messages and the context sensitive predictive text dictionary suggests to the user, in a suggestion list 1004, the words 'Adidas', 'Puma', 'Reebok', and 'shoes'. In this example several sport shoes manufacturer have purchased positions in the suggestion list 1004. When words in a shoe-context is entered the manufacturers sponsored words are shown in a suggestion list before regular and not sponsored words.

In similar manners the as described in above embodiments context based dictionaries can be used in many different contexts such as by fan clubs, replacing the name of the admired person by his nick name, sport clubs, new product lines replaces equipment words, traveling, replacing descriptive words (e.g. the tomb) with the native or local name (e.g. Cheops pyramid), etc.

Figure 11:
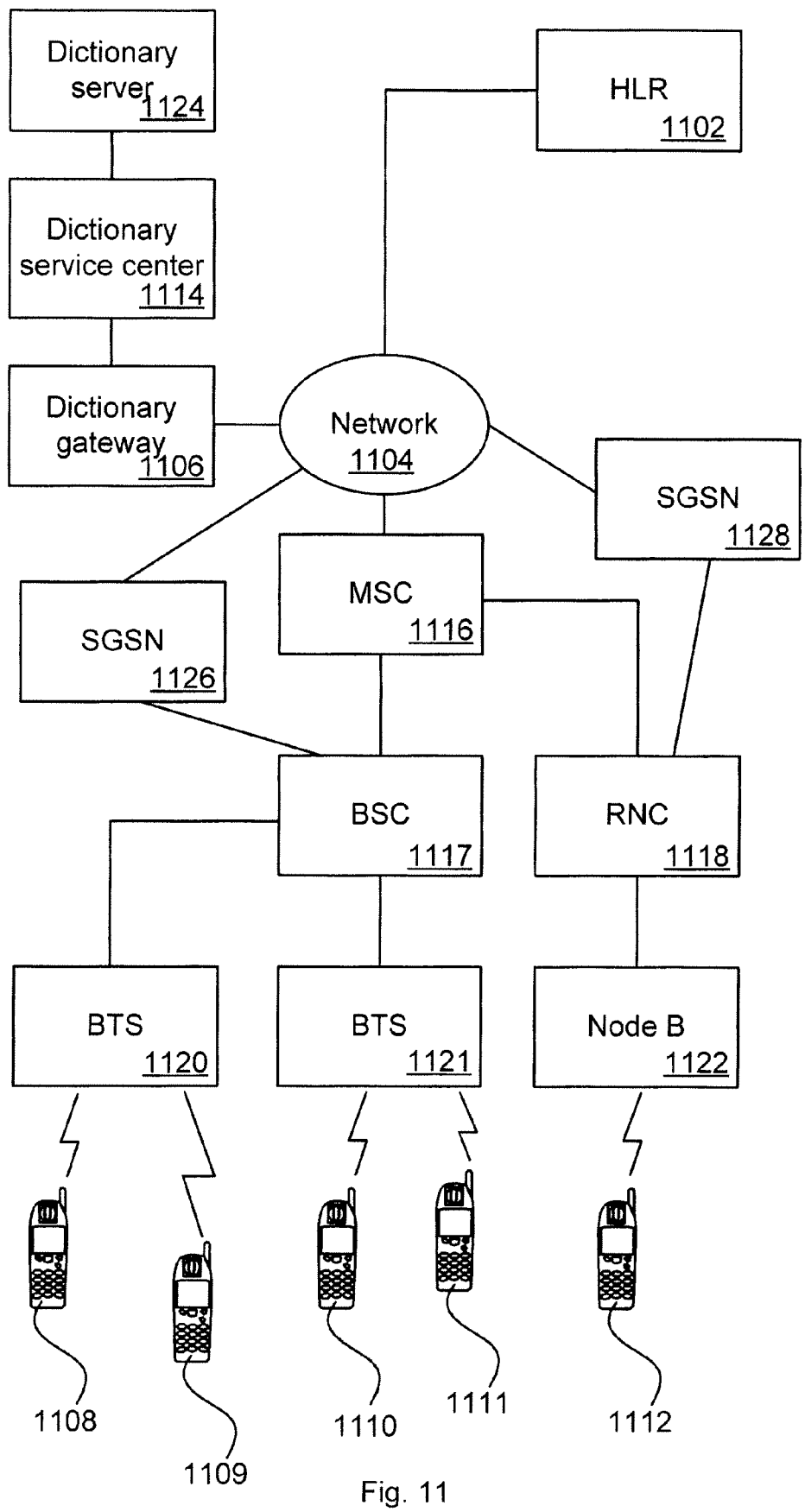
FIG. 11 schematically illustrates a system according to an embodiment.

A system architecture for managing a system according to an embodiment is shown in FIG. 11. A Home Location Register (HLR) 1102 contains a database (not shown) including relevant subscriber information for provision of telecommunication service. A CCITT specified network 1104 interconnects the individual parts of the system 1100. A dictionary gateway 1106 is a switching unit routing a requested dictionary to a mobile communication apparatus 1108-1112. An Dictionary Service Center 1114 (DSC) and the dictionary gateway 1106 handles and routes the dictionaries between the DSC 1114 and the network 1104. From the network 1104, the dictionaries are routed to the mobile communication apparatuses 1108-1112 via a Mobile Switching Center (MSC) 1116 to a Base Station Controller (BSC) 1117 and a Base Transceiver Station (BTS) 1120, 1121, or a Radio Network Controller (RNC) 1118 and a Node B 1122. Alternatively, the dictionaries are routed to the mobile communication apparatuses 1108-1112 via a Serving GPRS Support Node (SGSN) 1126, 1128 to the BSC 1117 and the BTS 1120, 1121, or the RNC 1118 and the Node B 1122, respectively. The BTS 1120, 1121 or the Node B 1122 establishes the air connection to the mobile communication apparatuses 1108-1112.

According to an embodiment, a network operator or other third party company, for example the provider of the application, handling a dictionary server 1124 could offer a dictionary service function where dictionaries associated with certain applications can be purchased. For example a network operator may have a dictionary server 1124 supporting a feature where the user may send a dictionary request from his mobile communication apparatus 1108-1112 to the dictionary server 1124 upon using a certain application of the mobile communication apparatus, e.g. a gaming or messaging application.

Figure 12:
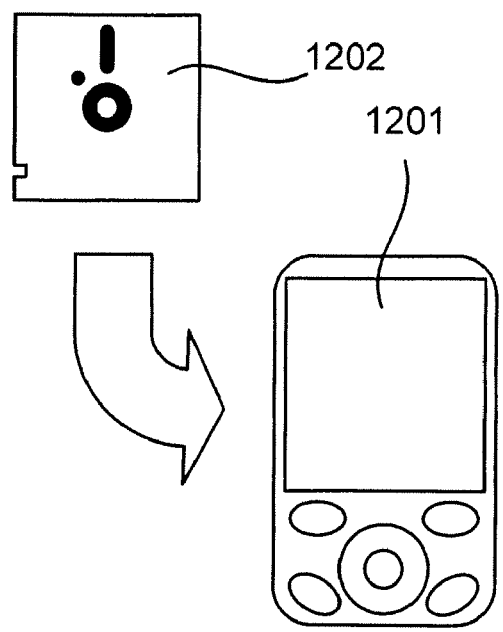
FIG. 12 illustrates a computer readable medium according to an embodiment.

The invention can be computer-implemented, i.e. the media handling is performed on a general or dedicated computerized apparatus 1201, such as a personal computer, a mobile phone, a digital camera, a personal digital assistant, a media player, or other similar apparatus. Instructions for performing the invention can then be executed by the apparatus. These instructions can be loaded into the apparatus 1201 from a computer-readable medium 1202, as exemplary illustrated in FIG. 12, having a data structure stored. The data structure comprises the control instructions, which upon execution causes the apparatus to perform any of the disclosed embodiments as described above.

Figure 13:
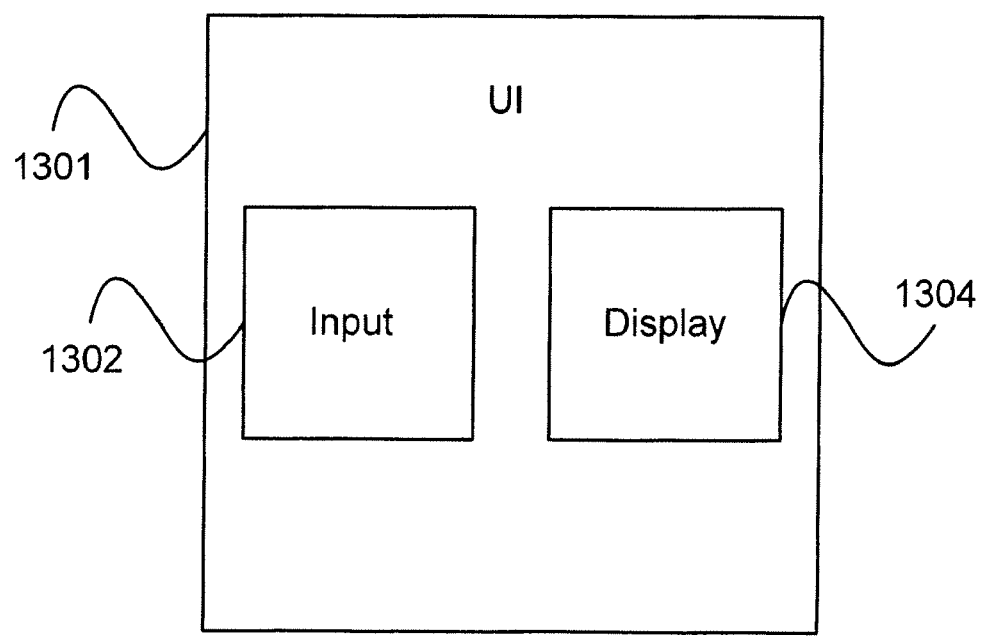
FIG. 13 illustrates an exemplary user interface of the disclosed embodiments.

FIG. 13 illustrates a user interface (UI) 1301 in a portable apparatus having an input interface 1302, which as described in above embodiments can be actuated by a user, and a display interface 1304 for displaying information to the user as described in the above embodiments.

While the embodiments have been described with specificity to handheld communication devices, other types of computing devices with which the embodiments can be used will occur to those skilled in the art. For example, a personal computer can benefit from the invention in the same manner as the handheld communication device. Further, while the illustrated embodiments discusses the use of user-configurability, the user-configurability may be implicit or provided in some other manner than described above. The above-described embodiments of the invention are intended to be examples of the invention and alterations and modification may be affected thereto, by those skilled in the art, without departing from the scope of the invention, which is defined solely by the claims appended hereto.

The invention claimed is:

1. A method, comprising:
   operating a portable apparatus so as to:
   store at least one context sensitive dictionary having a plurality of first words therein, a subset of one or more of the first words being associated with one or more respective associated words and phrases, the or each respective associated word and phrase representing an instance of the first word with which it is associated;
   enable character input by a user of the portable apparatus;
   compare input characters when input with the first words in the at least one context sensitive dictionary;
   determine, in dependence on the comparison, one or more first words in the context sensitive dictionary corresponding, at least partially, to the input characters;
   select, in dependence on the determination, one or more associated words and phrases associated with the determined first words; and
   display the selected one or more associated words and phrases to the user as a substitution for the input characters.

2. The method according to claim 1, the portable apparatus being further operable to communicate by wire or wirelessly with an external server via a network for acquiring said dictionary.

3. The method according to claim 2, the portable apparatus being further operable to: store said dictionary via said network; and retrieve said dictionary from said external server.

4. A method according to claim 1, wherein the portable apparatus is further operable to:
   display the selected one or more associated words to the user in a selection list; and
   receive a selection command from the user to select one of the displayed words for use as said substitution.

5. The method of claim 1 wherein each of the selected one or more associated words and phrases comprises the input characters.

6. The method of claim 1, wherein the first words and the associated words and phrases of the context sensitive dictionary are updated:
   automatically by the portable apparatus depending on a combination of one or more of location, time, and date; or
   by the user.

7. An apparatus, comprising:
   a processor;
   a memory storing at least one context sensitive dictionary having a plurality of first words therein, a subset of one or more of the first words being associated with one or more respective associated words and phrases, the or each respective associated word and phrase representing an instance of the first word with which it is associated;
   a display configured to display images to a user under the control of the processor; and
   a user input that enables user character input;
   wherein the processor is further configured to cause the apparatus to:
   compare input characters when input with the first words in the at least one context sensitive dictionary;
   determine, in dependence on the comparison, one or more first words in the context sensitive dictionary corresponding, at least partially, to the input characters; and
   select, in dependence on the determination, one or more associated words and phrases associated with the determined first words;
   the display being configured to display the selected one or more associated words and phrases to the user as a substitution for the input characters.

8. The apparatus according to claim 7, further comprising a renderer capable of communicating by wire or wirelessly with an external server via a network.

9. The apparatus according to claim 8, wherein said at least one context sensitive dictionary is stored and retrieved from said external server by said wire or wireless communication.

10. An apparatus according to claim 7, wherein the display is further configured to display the selected one or more associated words to the user in a selection list; the user input being configured to receive a selection command from the user to select one of the displayed words for use as said substitution.

11. The apparatus of claim 7, wherein the apparatus comprises a mobile phone, a PDA, a PDT, or a palmtop computer.

12. A computer program product comprising a computer-readable medium bearing computer program code embodied therein for use with a computer, the computer program code comprising:
   code for storing at least one context sensitive dictionary having a plurality of first words therein, a subset of one or more of the first words being associated with one or more respective associated words and phrases, the or each respective associated word and phrase representing an instance of the first word with which it is associated;
   code for enabling character input by a user of the computer;
   code for comparing input characters when input with the first words in the at least one context sensitive dictionary;

code for determining, in dependence on the comparison, one or more first words in the context sensitive dictionary corresponding, at least partially, to the input characters;

code for selecting, in dependence on the determination, one or more associated words associated with the determined first words; and code for displaying the selected one or more associated words to the user as a substitution for the input characters.

13. A computer program according to claim 12, the computer program code comprising:

code for displaying the selected one or more associated words to the user in a selection list; and code for receiving a selection command from the user to select one of the displayed words for use as said substitution.

14. A method, comprising:

operating a portable apparatus so as to:

store at least one context sensitive dictionary having a plurality of first words therein, a subset of one or more of the first words being associated with one or more respective associated words, the or each respective associated word being an additional word to be displayed in front of the first word with which it is associated;

enable character input by a user of the portable apparatus;

compare input characters when input with the first words in the at least one context sensitive dictionary;

determine, in dependence on the comparison, one or more first words in the context sensitive dictionary corresponding, at least partially, to the input characters;

select, in dependence on the determination, one or more associated words associated with the determined first words; and display the selected one or more associated words to the user as an additional word placed in front of the input characters.

15. A method according to claim 14, wherein at least one of the selected associated words is a proper noun.

16. The method of claim 14, wherein the first words and the associated words and phrases of the context sensitive dictionary are updated:

automatically by the portable apparatus depending on a combination of one or more of location, time, and date; or by the user.

17. An apparatus, comprising:

a processor;

a memory storing at least one context sensitive dictionary having a plurality of first words therein, a subset of one or more of the first words being associated with one or more respective associated words, the or each respective associated word being an additional word to be displayed in front of the first word with which it is associated;

a display configured to display images to a user under the control of the processor; and a user input that enables user character input;

wherein the processor is further configured to cause the apparatus to:

compare input characters when input with the first words in the at least one context sensitive dictionary;

determine, in dependence on the comparison, one or more first words in the context sensitive dictionary corresponding, at least partially, to the input characters; and select, in dependence on the determination, one or more associated words associated with the determined first words;

the display being configured to display the selected one or more associated words to the user as an additional word placed in front of the input characters.

18. An apparatus according to claim 17, wherein at least one of the selected associated words is a proper noun.

19. The apparatus of claim 17, wherein the apparatus comprises a mobile phone, a PDA, a PDT, or a palmtop computer.

20. A computer program product comprising a computer-readable medium bearing computer program code embodied therein for use with a computer, the computer program code comprising:

code for storing at least one context sensitive dictionary having a plurality of first words therein, a subset of one or more of the first words being associated with one or more respective associated words, the or each respective associated word being an additional word to be displayed in front of the first word with which it is associated;

code for enabling character input by a user of the computer;

code for comparing input characters when input with the first words in the at least one context sensitive dictionary;

code for determining, in dependence on the comparison, one or more first words in the context sensitive dictionary corresponding, at least partially, to the input characters;

code for selecting, in dependence on the determination, one or more associated words associated with the determined first words; and code for displaying the selected one or more associated words to the user as an additional word placed in front of the input characters.

* * * * *